(12) United States Patent
Saint-Hilaire

(10) Patent No.: US 8,402,084 B2
(45) Date of Patent: Mar. 19, 2013

(54) HOST EMBEDDED CONTROLLER INTERFACE BRIDGE

(75) Inventor: Ylian Saint-Hilaire, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 551 days.

(21) Appl. No.: 12/283,319

(22) Filed: Sep. 11, 2008

(65) Prior Publication Data

US 2010/0063990 A1 Mar. 11, 2010

(51) Int. Cl.
*G06F 15/16* (2006.01)

(52) U.S. Cl. ........ 709/202; 709/203; 709/223; 709/219; 707/610; 707/699; 707/944; 713/1; 370/389; 370/419; 726/5; 726/8

(58) Field of Classification Search .................. 709/202, 709/203, 223, 219; 707/610, 699, 944; 713/1; 370/389, 419; 726/5, 8
See application file for complete search history.

(56) References Cited

U.S. PATENT DOCUMENTS

| | | | | |
|---|---|---|---|---|
| 2003/0009541 A1* | 1/2003 | Sato | ............................. | 709/220 |
| 2003/0079075 A1* | 4/2003 | Asseline | ....................... | 710/315 |
| 2008/0244249 A1* | 10/2008 | Zimmer et al. | .................... | 713/1 |
| 2009/0063350 A1* | 3/2009 | Briggs et al. | ..................... | 705/59 |
| 2009/0080419 A1* | 3/2009 | Kutch | ............................. | 370/389 |
| 2009/0165099 A1* | 6/2009 | Eldar et al. | ........................ | 726/5 |
| 2009/0249462 A1* | 10/2009 | Chhabra | ........................... | 726/8 |

OTHER PUBLICATIONS

Intel® Software Network, "Architecture Guide: Intel® Active Management Technology", Published on Sep. 19, 2007, and Retrieved from http://softwarecommunity.intel.com/articles/eng/1032.htm; Sections 2.2 and 2.3.

* cited by examiner

*Primary Examiner* — Thoung Nguyen
(74) *Attorney, Agent, or Firm* — Barnes & Thornburg LLP

(57) ABSTRACT

A system, method, and computer readable medium are disclosed. In one embodiment the system includes a remote computer system. The remote computer system has a remote host embedded controller interface (HECI) driver and a HECI simulator. The HECI simulator intercepts commands directed to the HECI driver from software running on the remote computer system and routes the commands as HECI messages to a local computer system also included in the system. The local computer system includes a HECI bridge that is capable of receiving the HECI messages sent from the remote computer system and then can pass the received HECI messages to a local HECI driver to be operated upon.

14 Claims, 4 Drawing Sheets

HOST EMBEDDED CONTROLLER INTERFACE BRIDGE

FIELD OF THE INVENTION

The invention relates to routing host embedded controller interface messages between computers.

BACKGROUND OF THE INVENTION

The host embedded controller interface (HECI) allows an operating system running on a computer system to communicate directly with a Manageability Engine (ME), management device, management firmware, or other management logic within the computer system. For example, in many Intel® Corporation platforms, the HECI is used to communicate between a host system and a ME. System management information and events are communicated across the HECI interface. The HECI may also be referred to as the management engine interface (MEI). The HECI and MEI may be thought of as equivalent and they can be used interchangeably.

BRIEF DESCRIPTION OF THE DRAWINGS

The present invention is illustrated by way of example and is not limited by the drawings, in which like references indicate similar elements, and in which.

DETAILED DESCRIPTION OF THE INVENTION

Embodiments of a method and system for transparently routing host embedded controller interface (HECI) messages between computer systems are disclosed.

A computer system utilizing a HECI interface through a HECI driver can configure and manage several components on a computer system. These components and technologies may include fan speed control, Intel® Active Management Technology (AMT) or other management interfaces, remote management technology, and disk encryption technology among others. Many embodiments disclosed provide for accessibility to the HECI interface of a remotely managed computer to help with diagnostics, setup, and management of these various technologies.

Reference in the following description and claims to "one embodiment" or "an embodiment" of the disclosed techniques means that a particular feature, structure, or characteristic described in connection with the embodiment is included in at least one embodiment of the disclosed techniques. Thus, the appearances of the phrase "in one embodiment" appearing in various places throughout the specification are not necessarily all referring to the same embodiment. Any embodiments related to the computer readable medium refer to a non-transitory computer readable medium. Therefore, the computer readable medium may refer to a storage disk, memory, or other tangible medium that may store instructions to be executed by a computer, but it is not referring to a carrier wave or other non-tangible means upon which instructions may be represented.

In the following description and claims, the terms "include" and "comprise," along with their derivatives, may be used, and are intended to be treated as synonyms for each other. In addition, in the following description and claims, the terms "coupled" and "connected," along with their derivatives may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still cooperate or interact with each other.

Figure 1:
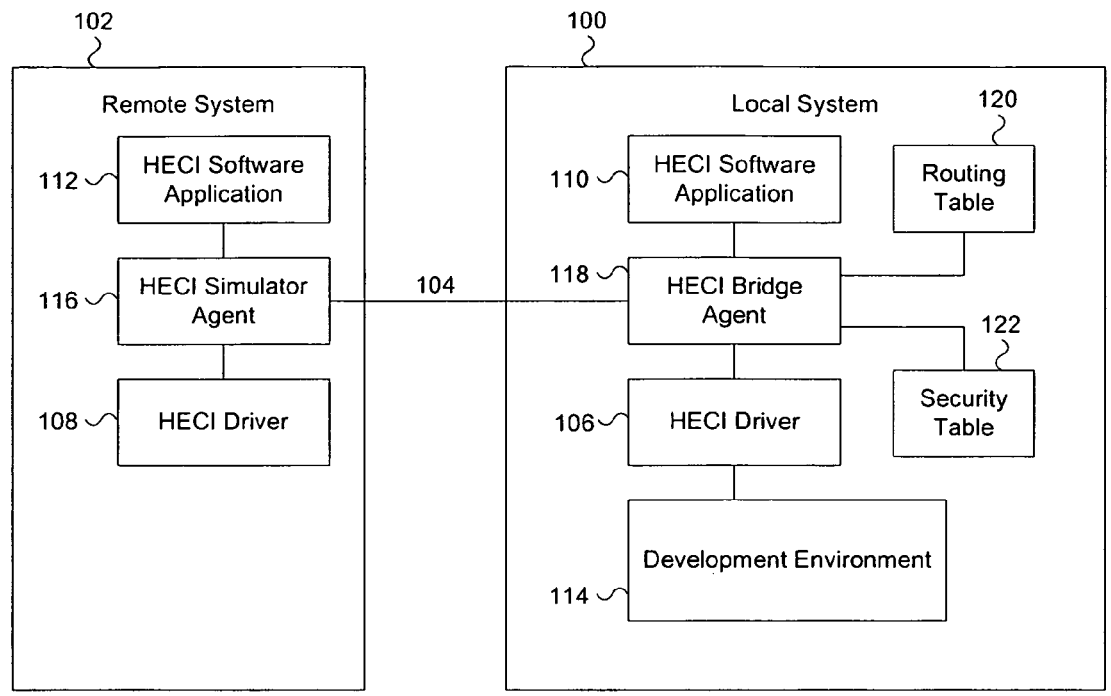
FIG. 1 describes an embodiment of a system to transparently route host embedded controller interface (HECI) messages between computer systems.

FIG. 1 describes an embodiment of a system to transparently route host embedded controller interface (HECI) messages between computer systems.

In many embodiments, a local computer system 100 and a remote computer system 102 are coupled through a network 104. The network 104 may be a wired network, such as an Ethernet network, or a wireless network, such as an IEEE 802.11-based network, a WiMax network, or a Bluetooth network, among others.

The local and remote computer systems each may include one or more central processors, each having one or more cores. Additionally the computer systems may include system memory to store instructions to be executed by the one or more processors. In many embodiments, both the local and remote computer systems support a host embedded controller interface (HECI). The HECI environment within each computer system is controlled by an HECI driver (HECI driver 106 on the local computer system 100 and HECI driver 108 on the remote computer system 102).

As mentioned above, a HECI driver is utilized to manage many different components on a computer platform. These components and technologies may include fan speed control, Intel® Active Management Technology (AMT) or other management interfaces, remote management technology, and disk encryption technology among others. Additionally, in many embodiments, one or more software applications running on each system may provide a form of control for one or more of the HECI components within a given system by sending HECI command messages to the HECI driver and receiving responses from the HECI driver based on the feedback from the one or more HECI components. For example, HECI software application 110 on the local computer system 100 may communicate with HECI driver 106 and HECI software application 112 on the remote computer system 102 may communicate with HECI driver 108.

In many other embodiments that are not shown, a similar driver and software application utilizing a protocol different from HECI may also be utilized to control these types of technologies within a given computer system.

Returning to FIG. 1, the local computer system 100 may have a development environment 114 that can include one or more hardware devices, software environments, firmware, and other items that are not standardized on all computer systems coupled to the network 104. For example, as part of its development environment 114, local computer system 100 may have a new version of disk encryption technology that the HECI driver 106 would control. This new version may be undergoing tests because the technology has not been put into production yet. At the same time, the new version of the disk encryption technology may not be locally present within the remote computer system 102.

Although the disk encryption technology may not be present on the remote computer system 102, a user of the remote computer system 102 may need access to the technology for development, testing, and/or other purposes. Thus, using the embodiment of the system in FIG. 1, the remote computer system 102 may remotely access the technology from within the local computer system's development environment 114 transparently. By having transparent access, the technology may appear to be located locally to higher level software that is running on the remote computer system 102.

In many embodiments, a HECI simulator agent 116 runs on the remote computer system and is communicatively located between the HECI software application 112 and the HECI driver 108. In other words, the HECI simulator agent 116 has the capability of intercepting communications that pass between the HECI software application 112 and the HECI driver 108. In many embodiments, the HECI software application 112 on the remote computer system 102 may be updated or modified to include control ability for the development environment technology located in the development environment 114 on the local computer system 100. Specifically, the HECI software application 112 on the remote computer system 102 may believe that the development environment technology is located locally on the system it resides within. Thus, the HECI software application 112 on the remote computer system 102 may send HECI command messages to the HECI driver 108 with the purpose of manipulating the development environment technology thought to be local to the remote computer system 102.

Each command (i.e. instruction) sent to the driver on the remote computer system 102 is first inspected by the HECI simulator agent 116. If the HECI command message targets an HECI technology local to the remote computer system (for example, a fan speed control HECI command message), the HECI simulator agent 116 allows the HECI command message to pass through to the HECI driver 108. On the other hand, if the HECI command message targets a technology related to the development environment that is not located on the remote computer system 102, the HECI simulator agent 116 intercepts the HECI command message, does not allow the HECI command message to reach the driver on the remote computer system, and instead, sends the HECI command message across the network 104 to the local computer system 100.

In many embodiments, the local computer system 100 includes a HECI bridge agent 118. The HECI bridge agent 118 is communicatively located between the HECI software application 110 and the HECI driver 106 within the local computer system 100. The HECI bridge agent 118 will receive the HECI command message sent across network 104 from remote computer system 102 and will route the HECI command message to the HECI driver 106. The driver will then communicate with the targeted technology in the development environment. This technology may be a device, piece of firmware, or other component located within the local computer system 100 as part of the development environment 114 that is not available in the remote computer system 102.

After the HECI driver 106 running on the local computer system 100 sends the HECI command message to the technology within the development environment 114, an HECI response message may be received by the HECI driver 106 from the development environment. The HECI driver 106 sends the HECI response message to the HECI bridge agent 118. The HECI bridge agent 118 then determines whether the HECI response message is sent to the HECI software application 110 on the local computer system 100 or the HECI software application 112 located on the remote computer system 102.

In many embodiments, the destination of the HECI response message is determined by the HECI bridge agent 118 by looking up the specific type of response, the target address of the response, or by receiving additional information from the response. The HECI bridge agent 118 may utilize a routing table 120 to determine the specific target software application where the HECI response message is to be sent.

When the HECI response message is sent by the HECI bridge agent 118 across network 104 in an HECI message, the HECI simulator agent 116 will receive the HECI response message and route it to the HECI software application 112 on remote system 102. At this point, the HECI software application 112 has received a HECI response message for a HECI command message it originally attempted to send to the HECI driver 108 on the remote computer system 102. The capability exists to perform this entire remote routing process without the HECI software application 112 on the remote computer system 102 having knowledge that the HECI command message and HECI response message were sent across network 104. Thus, the HECI command message format travels between computer systems transparently (i.e. the upper level software application(s) running on a given computer system may be kept without the knowledge that there was a remote computer access).

In many embodiments that are not shown in FIG. 1, the HECI simulator agent 116 on the remote computer system 102 may have access to a local routing table to provide a similar function to routing table 120 on the local computer system 100.

Additionally, in many embodiments, the HECI bridge agent 118 may have the authority to restrict which HECI interfaces related to targeted technologies located within the local computer system 100 are available to be executed outside of the local computer system 100. For example, there may be three separate technologies within the local computer system 100 capable of being available to the remote computer system 102 through the HECI interface. These three technologies may be at different stages of development and/or may have different security restriction levels to access. Thus, the HECI bridge agent may have access to a security table 122 which stores access level rights per HECI interface technology in the development environment. In these embodiments, the incoming HECI messages from the remote computer system 102 may include a security clearance level, which is associated with the remote computer system 102 or potentially the specific user logged into the remote computer system 102. If the remote computer system 102 security clearance level is at least equal to a minimum security level associated with the HECI interface targeted technology, then the HECI bridge agent 118 may allow the message through to the HECI driver 106 for execution. Otherwise, if the security clearance level is not sufficient, the HECI bridge agent 118 may not allow the message to be sent to the HECI driver 106. In different embodiments, the HECI bridge agent may or may not inform the remote computer system 102 that it's request was denied.

In many embodiments, the HECI channel that is created by the HECI connection between the HECI bridge agent on the local computer system 100 and the HECI simulator agent 116 on the remote computer system 102 may implement a form of security and authentication to verify that the remote computer system 102 is actually who it says it is. This may discourage hacking into the local computer system's development environment.

In many embodiments, the HECI connection between the local and remote computer systems may implement data compression when appropriate. This compression may be implemented on the local computer system 100 by the HECI bridge agent 118 and on the remote computer system 102 by the HECI simulator agent 116. Thus, the traffic being sent across the network between the local and remote computer systems would be compressed to decrease the total amount of traffic sent.

Figure 2:
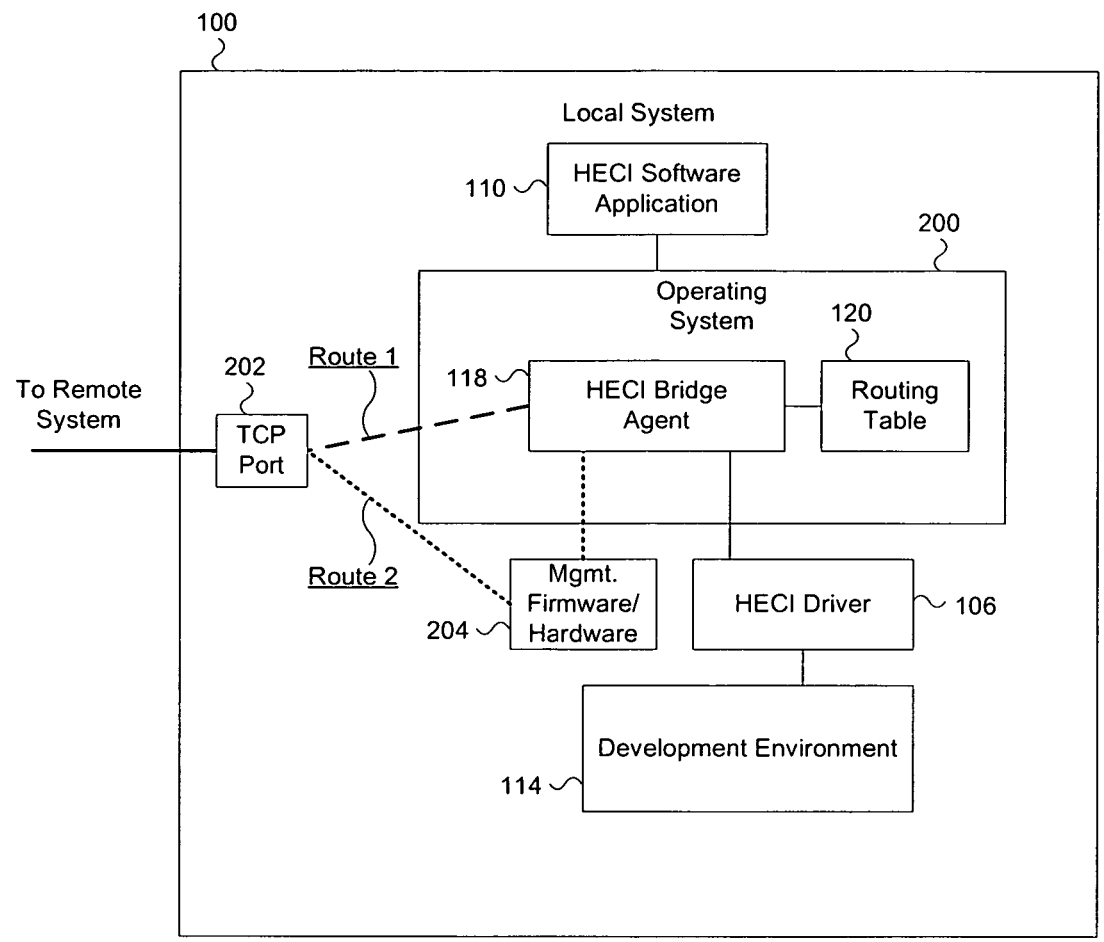
FIG. 2 describes multiple embodiments of an HECI message routing implementation on the local computer system containing the development environment.

FIG. 2 describes multiple embodiments of an HECI message routing implementation on the local computer system containing the development environment.

The local computer system 100 in FIG. 2 is a more detailed illustration of an embodiment of the local computer system as shown in FIG. 1. The local computer system 100 includes the HECI driver 106, HECI software application 110, development environment 114 containing the targeted technology, the HECI bridge agent 118, and the routing table 120 from FIG. 1. In addition to these components, the local computer system 100 also includes an operating system (OS) 200 that runs on the computer system. The OS may be a Microsoft® Windows®-based OS, a Linux-based OS, an Apple®-based OS, or any other possible OS capable of running a computer system. Upon boot up, the operating system 200 is loaded into a memory within the local computer system 100. The HECI bridge agent 118 and the routing table 120 are also loaded into the memory.

In some embodiments, the HECI incoming and outgoing messages to and from the remote computer system (102 in FIG. 1) take Route 1 (which is highlighted with the dashed line). In a Route 1 implementation, the HECI bridge agent 118, which is loaded with the running OS, listens on a local TCP (transmission control protocol) port for incoming HECI messages. In many embodiments, the incoming message contains a globally unique identifier (GUID) that corresponds to the targeted technology within the development environment 114. Thus, the HECI bridge agent 118 receives a HECI message with a GUID that specifies a targeted technology in the development environment. The HECI bridge agent 118 will then pass the HECI message to the HECI driver 106, which, in turn, will communicate with the targeted technology in the development environment 114 using the message (i.e. the remote HECI command message from the remote computer system).

After the HECI command message has been serviced, a HECI response message from the targeted technology through the HECI driver 106 arrives at the HECI bridge agent 118, which sends the HECI response message back across the network that is connected through TCP port 202 to the remote computer system. Therefore, Route 1 comprises an in-band management route that directly utilizes an OS agent listening on the TCP port 202.

Route 2 (which is highlighted as the dotted line), on the other hand, deals with a partially out-of-band setup management process. In-band management vs. out-of-band management refers to how remote computers contact each other. If two remote computers contact each other over a network and the contact requires the computers to be running and operational (i.e. using the processor(s) and OSs in the respective computers to communicate), the resulting communication is said to be in-band. Out-of-band differs in that at least a portion of the communication may be completed without both computers fully operational. A computer may include management firmware or a dedicated management hardware device (such as management firmware/hardware 204 in FIG. 2). A computer that has such management firmware and/or hardware may have the capability to be remotely managed even when the computer is not fully operational. Thus, the management firmware/hardware may be contacted and successfully communicated with by a remote administrator or other remote agent when the computer system is not fully operational.

Returning to FIG. 2, in some embodiments using Route 2, the local computer system 100 may utilize an out-of-band communication channel through the management firmware/hardware 204. The remote computer system (102 in FIG. 1) may communicate with the local computer system 100 by sending the HECI message to the local computer system 100 using this out-of-band communication channel. The HECI message is received from the network at the management firmware/hardware 204 and then subsequently sent to the HECI bridge agent 118 running in the OS 200 (at this point, Route 2 switches from out-of-band to in-band). If the system is not fully operational or busy, the management firmware/hardware may, in some embodiments, send a HECI response message back to the remote computer system informing it that the targeted technology is not available and/or the HECI message has been queued and will be sent to the targeted technology when it becomes available.

If the system is operational, and the HECI bridge agent receives the HECI message from the management firmware/hardware 204, the message can then be passed to the HECI driver 106, which then communicates with the targeted technology within the development environment. The same path may be taken by the HECI response message from the targeted technology back to the remote system. Namely, the targeted technology within the development environment communicates with the HECI driver 106, which sends the HECI response message to the HECI bridge agent 118 running in the OS 200. The HECI bridge agent, using the routing table to determine the final destination of the HECI response message, sends the HECI response message to the management firmware/hardware 204, which sends the HECI response message across the network to the remote computer system.

In other embodiments not shown, the local computer system does not utilize a TCP port to connect across the network, but rather uses another type (i.e. protocol) of connecting agent to connect between the local computer system and remote computer system.

Figure 3:
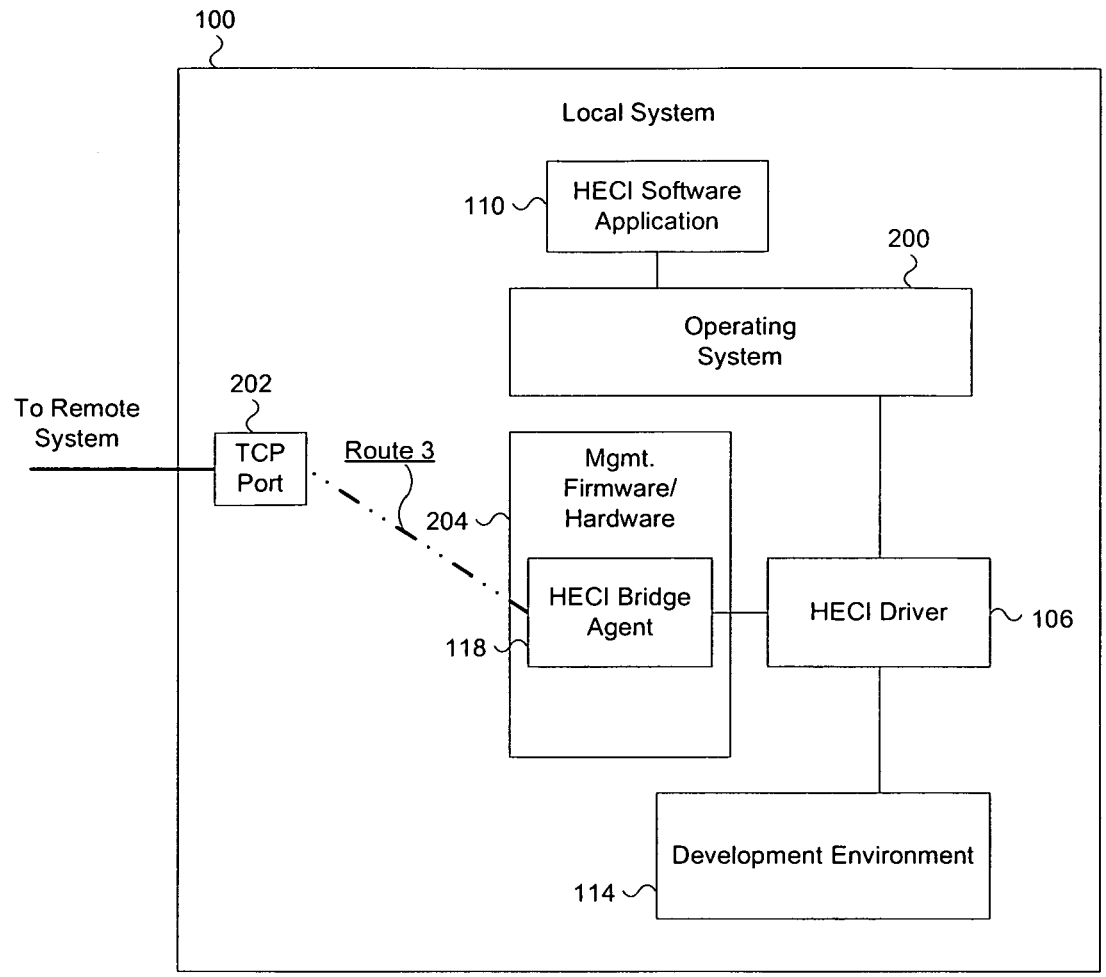
FIG. 3 describes a further embodiment of an HECI message routing implementation on the local computer system containing the development environment.

FIG. 3 describes a further embodiment of an HECI message routing implementation on the local computer system containing the development environment.

Again, the local computer system 100 in FIG. 3 is a more detailed illustration of an embodiment of the local computer system as shown in FIG. 1. The local computer system 100 includes the HECI driver 106, HECI software application 110, development environment 114 containing the targeted technology, the HECI bridge agent 118, and the routing table 120 from FIG. 1. The local computer system additionally includes an OS 200, a TCP port 202, and management firmware/hardware 204 as discussed in FIG. 2.

In FIG. 3, the described Route 3 (which is highlighted by the dashed-dotted line) is entirely out-of-band. The out-of-band implementation is available because the HECI bridge agent 118 is integrated into the management firmware/hardware 204. In some embodiments, the HECI bridge agent 118 comprises instructions that are saved into firmware and are operated upon by the management hardware within 204. In other embodiments, the HECI bridge agent 118 is implemented in the hardware within 204. Thus, when the HECI bridge agent is implemented in management firmware/hardware 204, the HECI incoming and outgoing messages to and from the remote computer system (102 in FIG. 1) are routed directly through the management firmware/hardware 204 to the HECI driver 106. Thus, the HECI bridge agent 118 receives a HECI message with a GUID that specifies a targeted technology in the development environment 114. The HECI bridge agent 118 will then pass the HECI message to the HECI driver 106, which, in turn, will communicate with the targeted technology in the development environment 114 using the message (i.e. the remote HECI command message from the remote computer system).

After the HECI command message has been serviced, a HECI response message from the targeted technology through the HECI driver 106 arrives at the HECI bridge agent 118, which sends the HECI response message back across the network. Therefore, Route 3 comprises a out-of-band management route that does not ever reach the OS 200 in the local computer system 100.

Again, in other embodiments not shown, the local computer system does not utilize a TCP port to connect across the network, but rather uses another type (i.e. protocol) of connecting agent to connect between the local computer system and remote computer system.

Figure 4:
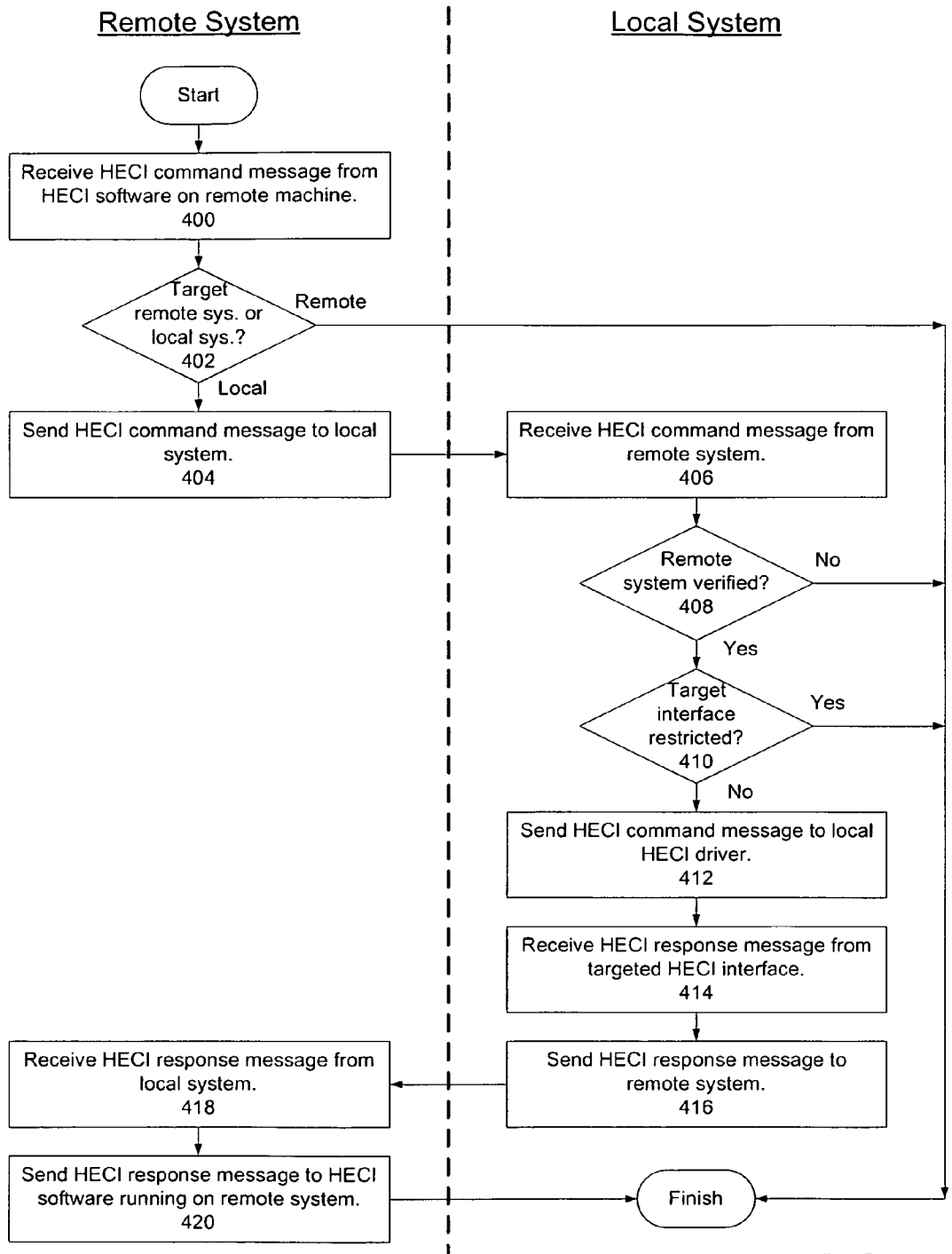
FIG. 4 is a flow diagram of an embodiment of a process to transparently forward HECI messages between computer systems.

FIG. 4 is a flow diagram of an embodiment of a process to transparently forward HECI messages between computer systems.

The process is performed by processing logic which may be comprised of software, hardware, or a combination of both. The processing logic may be located on two computer systems: a remote computer system and a local computer system. The remote computer system may include a standard set of HECI interfaces. The local computer system may include one or more extra HECI interfaces beyond the standard set of HECI interfaces. The one or more extra HECI interfaces may comprise interfaces to technology components on the local computer system that are not standard and, thus, not located on the remote computer system. For example, the local computer system may comprise a development environment for new technologies that have not been implemented in other computer systems, such as the remote computer system. In the embodiment shown in FIG. 4, the processing steps performed by processing logic on the remote system are shown to the left of the dashed line and the processing steps performed by processing logic on the local system are shown to the right of the dashed line.

Turning now to FIG. 4, the process begins by processing logic on the remote computer system receiving a HECI command message from software capable of communicating with one or more HECI interfaces on the remote computer system (processing block 400). The HECI software may believe that the HECI interfaces in the remote include one of the interfaces physically present on the local computer system but not on the remote computer system. Thus, HECI software on the remote computer system may attempt to communicate with an HECI interface corresponding to a technology component not present on the remote computer system.

Processing logic then determines whether the received HECI command message is targeting the remote system that it has originated on (i.e. it is targeting a standard HECI interface technology) or whether it is targeting the local system (i.e. it is targeting an HECI interface technology on the local system, but not on the remote system) (processing block 402). If the technology is present on the remote system, then there is no need to pass the message over a network to the local system because the remote system can execute the HECI command message and respond to the HECI software. On the other hand, if the technology is not present on the remote system, then processing logic sends the HECI command message to the local system (processing block 404).

Next, processing logic in the local system receives the HECI command message from the remote system (processing block 406). Then processing logic in the local system verifies whether the remote system is authentic (processing block 408). If the remote system cannot be verified as an authentic system, then the process is finished. Otherwise, if the remote system is verified, then processing logic in the local system checks to see if the target HECI interface is restricted (processing block 410). For example, the target HECI interface may be restricted if there is a security reason to limit access to the technology it corresponds with. If the restriction is present (i.e. the remote system is not allowed to access the technology, then the process is once again finished. If the remote system meets the restriction requirements or the technology is not restricted, then processing logic sends the HECI command message to the local HECI driver running on the local system (processing block 412). The HECI interface and corresponding technology present in the local system execute the HECI command message and return an HECI response message.

Thus, processing logic receives the HECI response message from the targeted HECI interface (processing block 414) and then sends the received HECI response message to the remote system (processing block 416).

Returning to the remote system, processing logic in the remote system receives the HECI response message from the local system (processing block 418) and sends the HECI response message to the HECI software that sent the original HECI command message (processing block 420) and the process is finished. Therefore, the HECI software on the remote system is able to send a HECI command message to an HECI interface technology it believes is on the remote system and receive a HECI response message based on the results of the execution of the HECI command message. In many embodiments, sending and receiving of HECI messages across a network between the remote and local systems is transparent to the HECI software (i.e. the HECI software is unaware that the HECI command message and HECI response message were routed external to the system it is running on).

Thus, embodiments of a method and system for transparently routing host embedded controller interface (HECI) messages between computer systems are disclosed. These embodiments have been described with reference to specific exemplary embodiments thereof. It will be evident to persons having the benefit of this disclosure that various modifications and changes may be made to these embodiments without departing from the broader spirit and scope of the embodiments described herein. The specification and drawings are, accordingly, to be regarded in an illustrative rather than a restrictive sense.

What is claimed is:

1. A system, comprising:
   a remote computer system including:
   a remote host embedded controller interface (HECI) driver; and
   a HECI simulator to:
   intercept commands directed to the HECI driver from software running on the remote computer system; and
   route the commands as HECI messages to a local computer system;
   receive HECI messages sent from the local computer system; and pass the received HECI messages as responses to the software running on the remote computer system; and the local computer system including:
a HECI message routing table to list a set of response target addresses within the local computer system and a set of response target addresses within the remote computer system; and a HECI bridge, the bridge to
receive the HECI messages sent from the remote computer system;
pass the received HECI messages to a local HECI driver to be operated upon;
receive responses to the received HECI messages from the local HECI driver; and
route the responses as HECI messages to the remote computer system.

2. The system of claim 1, wherein the HECI bridge is further operable to:
receive the responses from the local HECI driver;
look up the target address of each response;
route each response targeting an address in the remote computer system to the remote computer system; and
route each response targeting an address in the local computer system to the local computer system.

3. The system of claim 1, wherein the HECI bridge is integrated in management firmware in the local computer system.

4. The system of claim 1, wherein the HECI bridge comprises an operating system agent in the local computer system.

5. The system of claim 1, wherein the HECI bridge is further operable to restrict the availability of one or more interfaces within the local computer system to the remote computer system.

6. A method, comprising:
intercepting commands directed to a remote host embedded controller interface (HECI) driver originating from software running on the remote computer system;
routing the commands as HECI messages to a local computer system;
receiving the HECI messages sent from the remote computer system;
passing the received HECI messages to a local HECI driver, running on the local computer system, to be operated upon;
receiving responses to the received HECI messages from the local HECI driver;
determining destinations for the responses to the received HECI messages using a HECI message routing table of the local computer system, the HECI message routing table to list a set of response target addresses within the local computer system and a set of response target addresses within the remote computer system;
routing the responses as HECI messages to the remote computer system;
receiving the HECI messages sent from the local computer system; and
passing the HECI messages received from the local computer system as responses to the software running on the remote computer system.

7. The method of claim 6, further comprising:
receiving the responses, from the local HECI driver, in the local computer system;
looking up the target address of each response;
routing each response targeting an address in the remote computer system to the remote computer system; and
routing each response targeting an address in the local computer system to the local computer system.

8. The method of claim 6, wherein the HECI bridge is integrated in management firmware in the local computer system.

9. The method of claim 6, wherein the HECI bridge comprises an operating system agent in the local computer system.

10. The method of claim 6, further comprising:
restricting the availability of one or more interfaces within the local computer system to the remote computer system.

11. A non-transitory computer readable medium, having embodied thereon instructions, which when executed by a processor, causes the processor to perform a method, comprising:
intercepting commands directed to a remote host embedded controller interface (HECI) driver originating from software running on the remote computer system;
routing the commands as HECI messages to a local computer system;
receiving the HECI messages sent from the remote computer system;
passing the received HECI messages to a local HECI driver, running on the local computer system, to be operated upon;
receiving responses to the received HECI messages from the local HECI driver;
determining destinations for the responses to the received HECI messages using a HECI message routing table of the local computer system, the HECI message routing table to list a set of response target addresses within the local computer system and a set of response target addresses within the remote computer system;
routing the responses as HECI messages to the remote computer system;
receiving the HECI messages sent from the local computer system; and
passing the HECI messages received from the local computer system as responses to the software running on the remote computer system.

12. The non-transitory computer readable medium of claim 11, further comprising:
receiving the responses, from the local HECI driver, in the local computer system;
looking up the target address of each response;
routing each response targeting an address in the remote computer system to the remote computer system; and
routing each response targeting an address in the local computer system to the local computer system.

13. The non-transitory computer readable medium of claim 11, wherein the HECI bridge is integrated in management firmware in the local computer system.

14. The non-transitory computer readable medium of claim 11, further comprising:
restricting the availability of one or more interfaces within the local computer system to the remote computer system.

* * * * *